(12) United States Patent
Nakamura et al.

(10) Patent No.: US 8,008,660 B2
(45) Date of Patent: Aug. 30, 2011

(54) DISPLAY APPARATUS AND ELECTROPHORETIC DISPLAY APPARATUS

(75) Inventors: Kiyoshi Nakamura, Suwa-gun (JP); Soichi Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 12/335,429

(22) Filed: Dec. 15, 2008

(65) Prior Publication Data
US 2009/0153946 A1   Jun. 18, 2009

(30) Foreign Application Priority Data
Dec. 18, 2007   (JP) ................................. 2007-325924

(51) Int. Cl.
*H01L 23/58* (2006.01)
(52) U.S. Cl. ................ 257/48; 257/40; 257/83; 257/84; 257/187; 257/257
(58) Field of Classification Search ................ 257/40, 257/48, 83, 84, 187, 257
See application file for complete search history.

(56) References Cited

U.S. PATENT DOCUMENTS
2002/0089497 A1 * 7/2002 Yudasaka ..................... 345/204

FOREIGN PATENT DOCUMENTS
| JP | 9-189673 A | 7/1997 |
|---|---|---|
| JP | 11-83779 A | 3/1999 |
| JP | 2005-353378 A | 12/2005 |
| JP | 2006-147785 A | 6/2006 |
| JP | 2007-256914 A | 10/2007 |
| SU | 424058 A * | 9/1974 |

* cited by examiner

*Primary Examiner* — Wai Sing Louie
(74) *Attorney, Agent, or Firm* — AdvantEdge Law Group, LLC (57) ABSTRACT

A display apparatus includes a substrate; a display area including a plurality of pixels provided on the substrate; a switching element provided for each of the pixels, the switching element including a first semiconductor layer formed of a first organic semiconductor; and a humidity sensor provided on the substrate and outside the display area. The humidity sensor includes, as a humidity sensitive layer, a second semiconductor layer formed of a second organic semiconductor having a correlation in terms of electric characteristics with the first organic semiconductor.

7 Claims, 5 Drawing Sheets

DISPLAY APPARATUS AND ELECTROPHORETIC DISPLAY APPARATUS

BACKGROUND

1. Technical Field

The present invention relates to display apparatuses and electrophoretic display apparatuses.

2. Related Art

Semiconductors such as organic semiconductors formed of organic materials have been used for producing devices. In particular, organic transistors can be fabricated by a wet process such as an ink jet process or spin coating, thereby reducing the process cost as compared with the case using a process such as vapor deposition. For this reason, applications of organic transistors to apparatuses such as display apparatuses are expected.

Organic semiconductors are susceptible to degradation by light such as ultraviolet light, oxygen, water, and temperature. Degradation changes the electric characteristics of organic semiconductors. To prevent such degradation, organic semiconductors are mounted as devices such that they are isolated from the ambient environment. Typically, organic semiconductors are mounted so as to be sealed with sealing structures. JP-A-9-189673 and JP-A-11-83779 disclose use of organic polymers, semiconductors, and the like as humidity sensitive layers of humidity sensors.

However, sealing of organic semiconductors increases the expense of producing devices. Even if the production cost of organic semiconductors is reduced, an increase in the cost of sealing the organic semiconductors hampers reduction of the entire production cost of the devices. In contrast, when no sealing structure or a simple sealing structure is provided to organic semiconductors, change in the electric characteristics caused by degradation of the organic semiconductors is not properly addressed.

SUMMARY

An advantage of some aspects of the invention is that it provides display apparatuses and electrophoretic display apparatuses at a low production cost.

Another advantage of some aspects of the invention is that it provides display apparatuses and electrophoretic display apparatuses that display images stably even when the ambient environment changes.

A display apparatus according to an aspect of the invention includes a substrate; a display area including a plurality of pixels provided on the substrate; a switching element provided for each of the plurality of pixels, the switching element including a first semiconductor layer formed of a first organic semiconductor; and a humidity sensor provided on the substrate and outside the display area, the humidity sensor including, as a humidity sensitive layer, a second semiconductor layer formed of a second organic semiconductor having a correlation in terms of electric characteristics with the first organic semiconductor.

As described above, the display apparatus according to an aspect of the invention includes a humidity sensor provided on the substrate and outside the display area. The humidity sensor includes, as a humidity sensitive layer, a second semiconductor layer formed of a second organic semiconductor having a correlation in terms of electric characteristics with the first organic semiconductor. The electric characteristics of the second semiconductor layer, which is under an environment similar to that of the first semiconductor layer, are thus determined with the humidity sensor. On the basis of the determination data reflecting the ambient humidity, the switching element can be optimally driven. In this way, electric characteristic change of the organic semiconductor caused by its degradation is determined when no sealing structure or a simple sealing structure has been provided. Such a display apparatus with no sealing structure or a simple sealing structure can be produced at a low cost and it can display images stably even when the ambient environment changes.

The first organic semiconductor and the second organic semiconductor in the display apparatus are preferably of the same type.

When the first organic semiconductor forming the first semiconductor layer and the second organic semiconductor forming the second semiconductor layer are of the same type, determination of the electric characteristics of the second semiconductor layer provides a determination result almost the same as the electric characteristics of the first semiconductor layer. This enhances accuracy of the humidity sensor.

In the display apparatus, it is preferred that the humidity sensor further includes a pair of electrodes each having a comb-shaped portion in plan view; and the comb-shaped portions sandwich the second semiconductor layer with teeth of the comb-shaped portions interlocking one another.

As described above, when the humidity sensor further includes a pair of electrodes each having a comb-shaped portion in plan view; and the comb-shaped portions sandwich the second semiconductor layer with teeth of the comb-shaped portions interlocking one another, the surface area of the second semiconductor layer that is in contact with the pair of electrodes is large. This increases accuracy with which the electric characteristics of the second semiconductor layer are determined.

The second semiconductor layer and the first semiconductor layer in the display apparatus are preferably identical in shape.

When the second semiconductor layer and the first semiconductor layer are identical in shape, the state of the second semiconductor layer is brought closer to that of the first semiconductor layer. Thus, the electric characteristics of the second semiconductor layer are brought closer to those of the first semiconductor layer.

The display apparatus preferably further includes a pixel electrode provided on the substrate for each of the plurality of pixels and connected to the switching element; and a control unit configured to determine electric characteristics of the second semiconductor layer to provide a determination result and to control a voltage to be applied to the pixel electrode on the basis of the determination result.

When the electric characteristics of the second semiconductor layer are determined to provide a determination result and a voltage to be applied to the pixel electrode is controlled on the basis of the determination result, the voltage is changed in accordance with degradation of the second semiconductor layer, when no sealing structure or a simple sealing structure has been provided to the second semiconductor layer and the second semiconductor layer has, as a result, degraded. In this way, the display apparatus displays images stably even when the electric characteristics of the first semiconductor layer change due to its degradation.

An electrophoretic display apparatus according to an aspect of the invention includes a device substrate including a plurality of pixels forming a display area and a switching element provided for each of the plurality of pixels, the switching element including a first semiconductor layer formed of a first organic semiconductor; a display substrate facing the device substrate; an electrophoretic layer held between the device substrate and the display substrate; a humidity sensor provided on the device substrate and outside the display area, the humidity sensor including, as a humidity sensitive layer, a second semiconductor layer formed of a second organic semiconductor having a correlation in terms of electric characteristics with the first organic semiconductor, the second semiconductor layer being positioned on the same level as the first semiconductor layer on the device substrate; and a pair of electrodes sandwiching at least a part of the second semiconductor layer.

As described above, the electrophoretic display apparatus according to an aspect of the invention includes a humidity sensor provided on the device substrate and outside the display area, the humidity sensor including, as a humidity sensitive layer, a second semiconductor layer formed of a second organic semiconductor having a correlation in terms of electric characteristics with the first organic semiconductor, the second semiconductor layer being positioned on the same level as the first semiconductor layer on the device substrate; and a pair of electrodes sandwiching at least a part of the second semiconductor layer. The electric characteristics of the second semiconductor layer, which is under an environment similar to that of the first semiconductor layer, are thus determined with the humidity sensor. On the basis of the determination data reflecting the ambient humidity, the switching element can be optimally driven. In this way, electric characteristic change of the organic semiconductor caused by its degradation is determined when no sealing structure or a simple sealing structure is provided. Such an electrophoretic display apparatus with no sealing structure or a simple sealing structure can be produced at a low cost and it can display images stably even when the ambient environment changes.

The second semiconductor layer in the electrophoretic display apparatus is preferably provided in an area of the device substrate such that the electrophoretic layer covers the second semiconductor layer in plan view.

When the second semiconductor layer is provided in an area of the device substrate such that the electrophoretic layer covers the second semiconductor layer in plan view, the ambient environment of the second semiconductor layer is brought closer to that of the first semiconductor layer. This enhances accuracy of the humidity sensor.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention is described with reference to the drawings.

Figure 1:
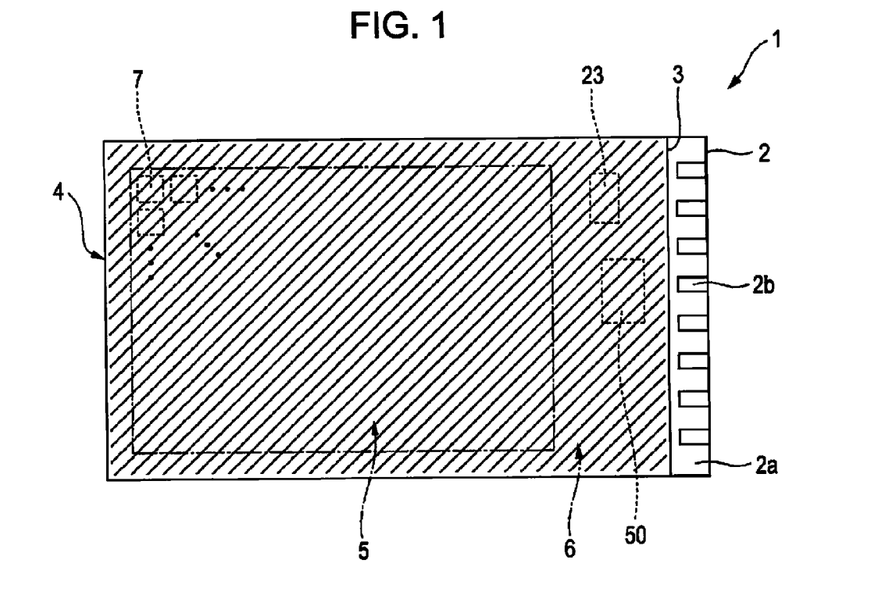
FIG. 1 is a plan view showing the configuration of an electrophoretic display apparatus according to a first embodiment of the invention.

FIG. 1 is a plan view showing the general configuration of an electrophoretic display apparatus 1 according to the first embodiment. The electrophoretic display apparatus 1 includes a device substrate 2, a counter substrate (display substrate) 3, and an electrophoretic layer 4. The electrophoretic layer 4 is held between the device substrate 2 and the counter substrate 3. The electrophoretic display apparatus 1 displays images such as still images and moving images in a display area 5 and does not display images in an area (non-display area) 6 surrounding the display area 5. The display area 5 has a plurality of pixels 7 arranged in a matrix. Each of the pixels 7 independently functions to collectively display images in the display area 5.

The device substrate 2 is a rectangular substrate that includes components for driving the electrophoretic display apparatus 1 such as electrodes, devices, and wiring. The device substrate 2 is longer in the horizontal direction in the drawing than the counter substrate 3 and hence it has an area (projecting area) 2a, which projects beyond the counter substrate 3. Terminals 2b for providing electrical connection to external components are provided on the projecting area 2a. A humidity sensor 23 and a control circuit 50, which are the core elements of the first embodiment, are provided in an area of the device substrate 2 where the non-display area 6 overlaps the electrophoretic layer 4 in plan view.

The counter substrate 3 is used to hold the electrophoretic layer 4 between the counter substrate 3 and the device substrate 2. The front surface side of the counter substrate 3 corresponds to the display surface side of the electrophoretic display apparatus 1. The electrophoretic layer 4 substantially covers the whole surface of the counter substrate 3 in plan view and is visible through the counter substrate 3.

Figure 2:
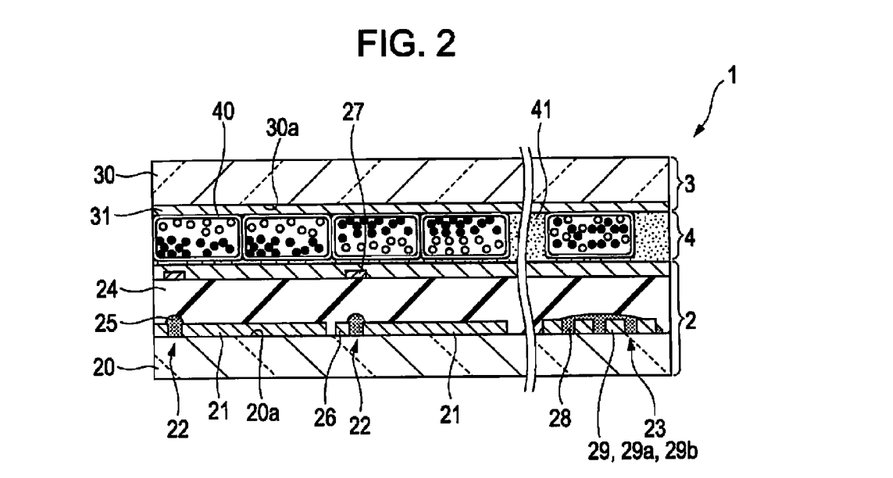
FIG. 2 is a section view showing the configuration of the electrophoretic display apparatus according to the first embodiment.

FIG. 2 is a section view showing the configuration of the electrophoretic display apparatus 1. The device substrate 2 includes a substrate 20, pixel electrodes 21, switching elements 22, a humidity sensor 23, and a gate insulating layer 24.

The substrate 20 is, for example, a plastic substrate (resin substrate) formed of a material such as polyimide, polyethylene terephthalate (PET), polyethylene naphthalate (PEN), polymethyl methacrylate (PMMA), polycarbonate (PC), polyether sulfone (PES), or an aromatic polyester (liquid crystal polymer). Alternatively, a non-plastic substrate may be used such as a glass substrate, a quartz substrate, a silicon substrate, or a gallium arsenide substrate. An under layer (not shown) is disposed on the inner surface 20a of the substrate 20. The pixel electrodes 21 are arranged on the under layer in an area where, in plan view, the under layer overlaps the pixels 7 in the display area 5.

Every pixel electrode 21 is provided with one switching element 22. The switching elements 22 turn ON and OFF electrical signals to the pixel electrodes 21. Each switching element 22 includes a first semiconductor layer 25, a source electrode 26, and a gate electrode 27.

The first semiconductor layer 25 is a thin layer formed of an organic semiconductor (first organic semiconductor). The first semiconductor layer 25 includes a source area on the left side in the drawing, a drain area on the right side in the drawing, and a channel area in the center. The channel area preferably has a channel length in the range of 0.1 to 100 µm, more preferably 5 to 50 µm. The channel area preferably has a channel width in the range of 1 to 1,000 µm. Examples of the organic semiconductor material for forming the first semiconductor layer 25 may include: low-molecular-weight organic semiconductor materials such as naphthalene, naphthacene, anthracene, tetracene, pentacene, hexacene, phthalocyanine, perylene, hydrazone, triphenylmethane, diphenylmethane, stilbene, arylvinyl, pyrazoline, triphenylamine, triarylamine, oligothiophene, phthalocyanine, and derivatives of the foregoing; and high-molecular-weight organic semiconductor materials such as hexylthiophene, P3HT, PQT12, F8T2, rubrene, poly-N-vinylcarbazole, polyvinylpyrene, polyvinylanthracene, polythiophene, polyhexylthiophene, poly(p-phenylenevinylene), polyethynylenevinylene, polyarylamine, pyrene-formaldehyde resins, ethylcarbazole-formaldehyde resins, fluorene-bithiophene copolymers, fluorene-arylamine copolymers, and derivatives of the foregoing. These materials may be used alone or in combination. In particular, π-conjugated organic semiconductor materials having one-dimensional π-conjugation are preferably used because such materials provide high carrier mobility. π-Conjugated organic semiconductor materials have very high carrier mobility due to the unique distribution of the electron cloud. For example, low-molecular-weight organic semiconductor materials such as pentacene provide a carrier mobility that is as high as that of amorphous silicon.

The source electrode 26 is connected to the source area of the first semiconductor layer 25. The pixel electrodes 21 in the first embodiment also each function as a drain electrode and are each directly connected to the drain area of the first semiconductor layer 25. The source electrode 26 and the pixel electrode 21 preferably have a thickness (length in the vertical direction in the drawing) in the range of 1 to 100 nm. The gate electrode 27 is disposed on the gate insulating layer 24 such that the gate electrode 27 is superposed on the channel region of the first semiconductor layer 25 in plan view. The first semiconductor layer 25 is positioned on the same level as the source electrode 26 and the pixel electrode 21 on the under layer, which is disposed on the inner surface 20a of the substrate 20.

Material for forming the source electrode 26 and the pixel electrode 21 is not particularly restricted as long as the material is conductive. Examples of the material may include: conductive materials such as Pd, Pt, Au, W, Ta, Mo, Al, Cr, Ti, Cu, and alloys of the foregoing; conductive oxides such as ITO, FTO, ATO, and $SnO_2$; carbon materials such as carbon black, carbon nanotubes, and fullerenes; and conductive polymers such as polyacetylene, polypyrrole, polythiophene like PEDOT (poly-ethylenedioxythiophene), polyaniline, poly(p-phenylene), polyfluorene, polycarbazole, polysilane, and derivatives of the foregoing. These materials may be used alone or in combination. The conductive polymers are typically used after being made conductive by being doped with iron oxide, iodine, inorganic acid, organic acid, or a polymer such as polystyrene sulphonic acid. Among the examples, materials mainly containing Ni, Cu, Co, Au, Pd, and alloys of the foregoing are preferably used.

The humidity sensor 23 includes a second semiconductor layer 28 as a humidity sensitive layer and electrodes 29 connected to the second semiconductor layer 28. The humidity sensor 23 is configured to determine the ambient humidity by determining the electric characteristics of the second semiconductor layer 28 such as storage capacity. The second semiconductor layer 28 is positioned on the same level as the electrodes 29 on the under layer, which is formed on the inner surface 20a of the substrate 20. The second semiconductor layer 28 and the electrodes 29 are also positioned on the same level as the first semiconductor layer 25 forming the switching element 22.

The organic semiconductor material (second organic semiconductor) for forming the second semiconductor layer 28 is preferably the same as the material for forming the first semiconductor layer 25 of the switching element 22. Alternatively, a different material may be used as long as the second organic semiconductor has a correlation in terms of electric characteristics with the material for forming the first semiconductor layer 25.

The electrodes 29 include a pair of electrodes (hereinafter, referred to as electrodes 29a and 29b) such that the pair of electrodes sandwich at least a part of the second semiconductor layer 28. The electrodes 29a and 29b are preferably formed with the same material used for forming the source electrode 26 and the pixel electrode 21. The electrodes 29a and 29b preferably have a thickness in the range of 1 nm to 100 µm. The first embodiment employs an electrical resistance sensor that determines the electric characteristics of the second semiconductor layer 28 by applying a certain voltage across the electrodes 29a and 29b and determining the magnitude of a current passing through the second semiconductor layer 28. Alternatively, a capacitance sensor may be used that determines the electric characteristics of the second semiconductor layer 28 by applying a certain voltage across the electrodes 29a and 29b and determining the capacitance of the second semiconductor layer 28.

The gate insulating layer 24 insulates the gate electrode 27 from the source electrode 26 and the pixel electrode 21. The gate insulating layer 24 is provided substantially over the whole surface of the substrate 20 such that the gate insulating layer 24 covers the source electrodes 26, the pixel electrodes 21, and the humidity sensor 23 including the second semiconductor layer 28 and the electrodes 29. The gate insulating layer 24 is preferably formed mainly of an organic material, in particular, an organic polymer. The gate insulating layer 24 that is formed mainly of an organic polymer is easily formed and a high degree of adhesion of the gate insulating layer 24 to the first semiconductor layer 25 and the second semiconductor layer 28 is achieved. Examples of such an organic polymer may include: acrylic resins such as polystyrene, polyimide, polyamide imide, polyvinylphenylene, polycarbonate (PC), and polymethyl methacrylate; fluorocarbon resins such as polytetrafluoroethylene (PTFE); phenolic resins such as polyvinylphenol and novolac resins; and olefin resins such as polyethylene, polypropylene, polyisobutylene, and polybutene. These polymers may be used alone or in combination. The gate insulating layer 24 preferably has a thickness in the range of 50 nm to 10 µm, more preferably 100 to 1,000 nm.

Figure 3:
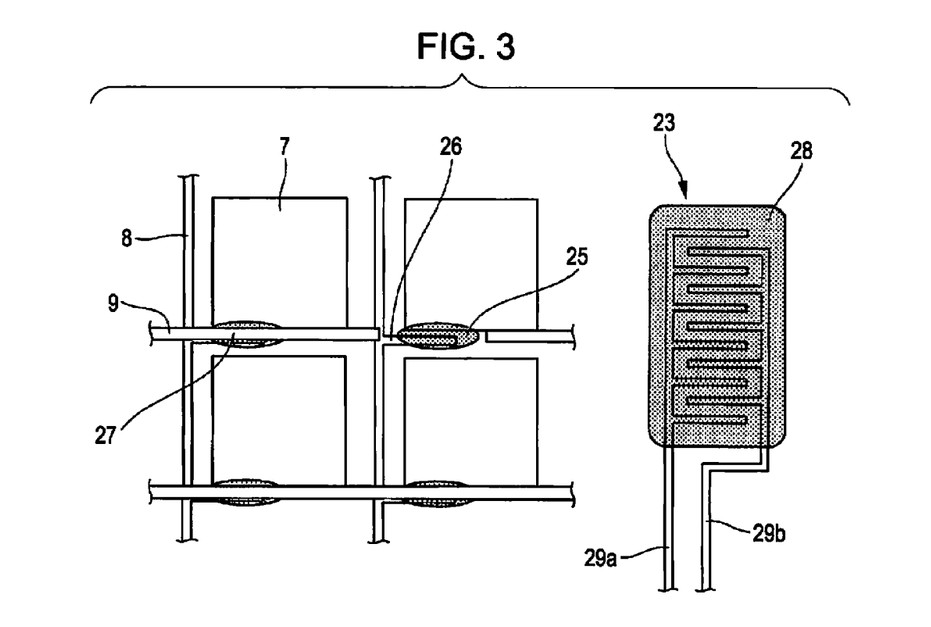
FIG. 3 is a plan view showing the configuration of the device substrate of the electrophoretic display apparatus.

FIG. 3 is a plan view showing a partial configuration of the device substrate 2 of the electrophoretic display apparatus 1. The gate insulating layer 24 is not shown in FIG. 3. Data lines 8 and gate lines 9 are arranged between the pixels 7 in a grid pattern. The data lines 8 are wires extending vertically in the drawing and are connected to the source electrodes 26. The gate lines 9 are wires extending horizontally in the drawing and are connected to the gate electrodes 27. The humidity sensor 23 does not function as a switching element. To prevent a malfunction in the humidity sensor 23, the gate lines 9 and the gate electrodes 27 are not disposed over the second semiconductor layer 28 in plan view.

The second semiconductor layer 28 is larger than the first semiconductor layer 25 in plan view in the first embodiment. Alternatively, the second semiconductor layer 28 may be formed so as to be identical to the first semiconductor layer 25 in size and shape. The electrodes 29a and 29b each has a comb-shaped portion in plan view. The comb-shaped portions sandwich the second semiconductor layer 28 with teeth of the comb-shaped portions interlocking one another at regular spacing. The spacing between the electrodes 29a and 29b, that is, the spacing between the surfaces of the comb teeth facing each other is preferably in the range of 0.1 to 100 μm. Portions of the electrodes 29a and 29b facing each other preferably have a length, in plan view, in the range of 1 to 100,000 μm. To enhance the accuracy of determining the electric characteristics, the spacing between the electrodes is preferably smaller and the length of the portions facing each other is preferably larger in plan view. The electrodes 29a and 29b preferably have a width of 1 μm or more.

Referring back to FIG. 2, the counter substrate 3 has a substrate 30 and a common electrode 31. The substrate 30 is a rectangular substrate formed of a highly light-transmissive material such as polyethylene terephthalate (PET), polyether sulfone (PES), or polycarbonate (PC). The common electrode 31 is a thin-film electrode substantially covering the whole surface of the inner surface 30a of the substrate 30. The common electrode 31 is typically formed of a conductive material with high light transmittance such as ITO.

The electrophoretic layer 4 is held between the pixel electrodes 21 of the device substrate 2 and the common electrode 31 on the counter substrate 3. The electrophoretic layer 4 includes a plurality of microcapsules 40 and a binder 41.

Each of the microcapsules 40 is a generally spherical capsule containing an electrophoretic fluid dispersion. The microcapsules 40 have almost the same diameter as one another. Examples of a material for forming the wall membranes of the microcapsules 40 may include gum arabic-gelatin composite membranes, polyurethane resins, urea resins, and urea-formaldehyde resins. The electrophoretic fluid dispersion encapsulated in the microcapsules 40 is composed of electrophoretic particles and a liquid dispersion medium into which the electrophoretic particles have been dispersed.

Examples of the liquid dispersion medium may include water, alcohol solvents, esters, ketones, aliphatic hydrocarbons, alicyclic hydrocarbons, aromatic hydrocarbons, halogenated hydrocarbons, carboxylates, and other various oils. These examples may be used alone or in combination with an agent such as a surfactant.

Examples of the electrophoretic particles may include organic and inorganic particles (polymers and colloids) that electrophoretically migrate in a liquid dispersion medium in response to a potential difference. Specifically, examples of the electrophoretic particles may include: black pigments such as carbon black and aniline black; white pigments such as titanium dioxide; azo pigments such as monoazo pigments; yellow pigments such as isoindolinone; azo pigments such as monoazo pigments; red pigments such as quinacridone red; blue pigments such as phthalocyanine blue; and green pigments such as phthalocyanine green. These pigments may be used alone or in combination. If desired, agents may be added to the pigments. Examples of the agents may include electrolytes; surfactants; charge control agents containing particles of metallic soap, resin, rubber, oil, varnish, compound, or the like; dispersing agents such as titanium coupling agents, aluminum coupling agents, and silane coupling agents; lubricants; and stabilizing agents.

For example, each of the microcapsules 40 contains two types of electrophoretic particles: titanium dioxide as a white pigment and carbon black as a black pigment. Particles of one type are negatively charged and particles of the other type are positively charged. Alternatively, other electrophoretic particles may be used. Alternatively, the display apparatus may be configured to electrophoretically migrate electrophoretic particles of one type to the common electrode 31 side or to the pixel electrode 21 side so as to display images.

The binder 41 is a member used for fixing the plurality of microcapsules 40 onto the counter substrate 3. The binder 41 is preferably formed with a material having a good compatibility with the wall membranes of the microcapsules 40, excellent adhesion to the common electrode 31, and insulation properties.

Figure 4:
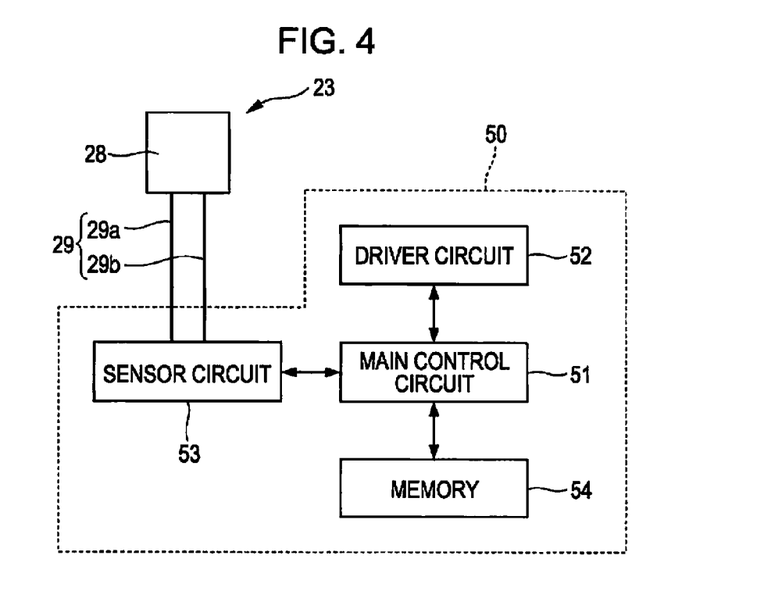
FIG. 4 is a block diagram showing the configuration of a control circuit.

FIG. 4 is a block diagram showing the configuration of a control circuit 50. The control circuit 50 is formed in the non-display area 6 of the device substrate 2. The control circuit 50 controls the electrophoretic display apparatus 1 to display images. The control circuit 50 includes a main control circuit 51 that performs comprehensive calculations to control other components; a driver circuit 52 that drives display operations; a sensor circuit 53 that receives signals from the humidity sensor 23 and applies a certain voltage to the electrodes 29 of the humidity sensor 23; and a memory 54 that stores data and the like.

Hereinafter, operations of the electrophoretic display apparatus 1 having the configuration are described briefly. When a voltage is applied across the pixel electrodes 21 and the common electrode 31 so that the common electrode 31 is subjected to higher voltage, positively-charged black electrophoretic particles are attracted to the pixel electrodes 21 side of the microcapsules 40 in response to the Coulomb force. In contrast, negatively-charged white electrophoretic particles are attracted toward the common electrode 31 in the microcapsules 40 in response to the Coulomb force. In this way, the white electrophoretic particles gather on the counter substrate 3 side of the microcapsules 40, resulting in display of the color (white) of the white electrophoretic particles in the display area 5 of the electrophoretic display apparatus 1.

Conversely, when a voltage is applied across the pixel electrodes 21 and the common electrode 31 so that the pixel electrodes 21 are subjected to higher voltage, negatively-charged white electrophoretic particles are attracted to the pixel electrodes 21 side in response to the Coulomb force. In contrast, positively-charged black electrophoretic particles are attracted to the common electrode 31 side in response to the Coulomb force. In this way, the black electrophoretic particles gather on the counter substrate 3 side of the microcapsules 40, resulting in display of the color (black) of the black electrophoretic particles in the display area 5 of the electrophoretic display apparatus 1.

When the sensor circuit 53 applies a certain voltage across the electrodes 29a and 29b, a current passes through the electrodes in accordance with the electric characteristics of the second semiconductor layer 28 sandwiched between the electrodes. The sensor circuit 53 determines the magnitude of the current and feeds the data on the determined current to the main control circuit 51. The main control circuit 51 determines the electric characteristics of the second semiconductor layer 28 on the basis of the fed current magnitude data. This is achieved, for example, as follows. Correlation data between the magnitude of the current and the electric characteristics of the second semiconductor layer 28 is stored in the memory 54 beforehand. The main control circuit 51 determines the electric characteristics of the second semiconductor layer 28 by comparing the data stored in the memory 54 and the determined value of the current.

Since the second semiconductor layer 28 of the humidity sensor 23 and the first semiconductor layer 25 of the switching element 22 are substantially under the same environment in the configuration of the electrophoretic display apparatus 1, it is concluded that the electric characteristics of the second semiconductor layer 28 are very similar to the electric characteristics of the first semiconductor layer 25 when the second semiconductor layer 28 and the first semiconductor layer 25 are formed of the same material. After determining the electric characteristics of the second semiconductor layer 28, the main control circuit 51 determines the magnitude of a voltage to be applied across the pixel electrodes 21 and the common electrode 31 and the time for which the voltage is to be applied on the basis of the electric characteristics. The main control circuit 51 feeds the determined voltage data to the driver circuit 52. The driver circuit 52 applies a voltage to the pixel electrodes 21 and the common electrode 31 on the basis of the determined voltage data from the main control circuit 51.

When the second semiconductor layer 28 and the first semiconductor layer 25 are formed of different materials but the materials have a correlation in terms of their electric characteristics, the electric characteristics of the first semiconductor layer 25 are estimated on the basis of the correlation data in terms of the electric characteristics that is stored in the memory 54 beforehand.

High water content in the first semiconductor layer 25 increases ionic conductivity, reducing resistivity of the bulk. This decreases impedance, increasing current (OFF-state current) that occurs when OFF-state voltage is applied across the pixel electrodes 21 and the common electrode 31. Also, trapping by the water occurs, decreasing mobility and current (ON-state current) that occurs when ON-state voltage is applied across the pixel electrodes 21 and the common electrode 31.

Since the dielectric constant of water ($\in=80$) is higher than that of the gate insulating layer 24, high water content of the gate insulating layer 24 increases its apparent dielectric constant, decreasing the threshold voltage $V_{TH}$ of the first semiconductor layer 25. This relatively increases ON-state current. In contrast, interface trapping between the gate insulating layer 24 and the first semiconductor layer 25 can increase, decreasing mobility and ON-state current. Such phenomena can increase or decrease ON-state voltage. For this reason, when the ON-state current is decreased (the threshold voltage $V_{TH}$ is increased), the driver circuit 52 is controlled to increase the ON-state voltage and the voltage applied to the gate electrode 27 above the first semiconductor layer 25. Additionally, the driver circuit 52 may be controlled to extend the time for which the ON-state voltage is to be applied and the time for which the voltage is to be applied to the gate electrode 27 above the first semiconductor layer 25.

When the ON-state current is increased (the threshold voltage $V_{TH}$ is decreased), the driver circuit 52 is controlled to decrease the ON-state voltage and the voltage applied to the gate electrode 27 above the first semiconductor layer 25. Additionally, the driver circuit 52 may be controlled to shorten the time for which the ON-state voltage is to be applied and the time for which the voltage is to be applied to the gate electrode 27 above the first semiconductor layer 25.

For example, the driver circuit 52 may be controlled only when change in the electric characteristics of the first semiconductor layer 25 is highly likely to cause a failure such as occurrence of burn-in in the display area 5. Alternatively, the driver circuit 52 may be controlled, before such a failure is highly likely to occur, when the performance of the first semiconductor layer 25 no longer satisfies a certain standard, for example, when a contrast decrease occurs or overwriting of images is no longer possible. When the driver circuit 52 is controlled but a failure etc. is still likely to occur, displaying may be terminated.

The electrophoretic display apparatus 1 having the configuration is manufactured as follows. The device substrate 2 is manufactured by forming the under layer on the substrate 20; subsequently forming the pixel electrodes 21, the first semiconductor layer 25, the source electrodes 26, the second semiconductor layer 28, and the electrodes 29 so as to be positioned on the same level as one another on the under layer; and subsequently forming the gate insulating layer 24 and the gate electrodes 27. Additionally, another insulating layer may be formed for the gate electrodes 27.

The counter substrate 3 side of the electrophoretic display apparatus 1 is configured as an electrophoretic sheet where the electrophoretic layer 4 is formed on the common electrode 31 and a bonding layer (not shown) is formed on the electrophoretic layer 4. Actually, the electrophoretic sheet is used with a protective removable sheet affixed to the surface of the bonding layer (not shown). The removable sheet is then removed from the electrophoretic sheet and the resulting electrophoretic sheet is attached to the device substrate 2 via the bonding layer, providing the electrophoretic display apparatus 1.

In the first embodiment, the second semiconductor layer 28 is disposed in the device substrate 2 so that the second semiconductor layer 28 is positioned on the same level as the first semiconductor layer 25. The second semiconductor layer 28 is formed of an organic semiconductor having a correlation in terms of electric characteristics with an organic semiconductor forming the first semiconductor layer 25 of the switching element 22. The electrodes 29 having a pair of electrodes are disposed such that the pair of electrodes sandwich at least a part of the second semiconductor layer 28. The electric characteristics of the second semiconductor layer 28, which is under an environment similar to that of the first semiconductor layer 25, are determined. The second semiconductor layer 28 is formed of an organic semiconductor having a correlation in terms of electric characteristics with an organic semiconductor forming the first semiconductor layer 25 of the switching element 22. For this reason, the electric characteristics of the first semiconductor layer 25 are estimated accurately by determining the electric characteristics of the second semiconductor layer 28. In this way, electric characteristic change of the organic semiconductor caused by its degradation is determined. The electrophoretic display apparatus 1 with no sealing structure or a simple sealing structure for the organic semiconductor can be produced at a reduced cost. The electric characteristic change of the organic semiconductor caused by its degradation can be addressed in the electrophoretic display apparatus 1.

The electric characteristics of the second semiconductor layer 28 are determined to provide a determination result. The magnitude of a voltage to be applied to the pixel electrodes 21 and the common electrode 31 and the time for which the voltage is to be applied are controlled on the basis of the determination result. In this way, when no sealing structure or a simple sealing structure has been provided for the second semiconductor layer 28 and the second semiconductor layer 28 has, as a result, degraded, the voltage applied to the pixel electrodes 21 is changed in accordance with the degradation of the second semiconductor layer 28. Consequently, images can be displayed stably even when the electric characteristics of the first semiconductor layer 25 change due to its degradation.

Since the second semiconductor layer 28 is provided in an area of the device substrate 2 such that the electrophoretic layer 4 covers the second semiconductor layer 28 in plan view, the electrophoretic layer 4 covers the second semiconductor layer 28 as well as the first semiconductor layer 25. Therefore, the ambient environment of the second semiconductor layer 28 is brought closer to that of the first semiconductor layer 25.

Second Embodiment

Figure 5:
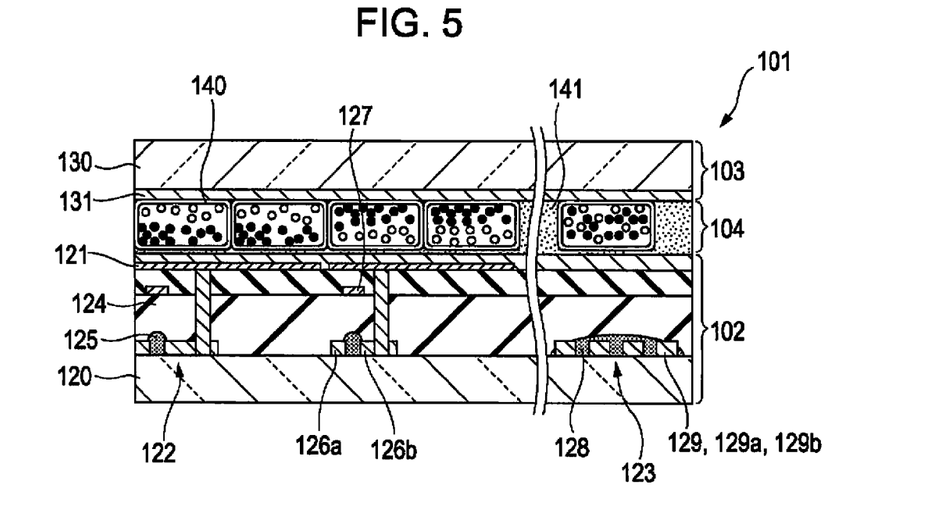
FIG. 5 is a section view showing the configuration of an electrophoretic display apparatus according to a second embodiment of the invention.

Hereinafter, a second embodiment of the invention is described. FIG. 5 is a section view showing the configuration of an electrophoretic display apparatus 101 according to the second embodiment. FIG. 5 corresponds to FIG. 2 of the first embodiment. The second embodiment is different from the first embodiment in terms of the configuration of the device substrate 102. The electrophoretic display apparatus 101 includes the device substrate 102, a counter substrate 103, and an electrophoretic layer 104. The device substrate 102 includes a substrate 120, pixel electrodes 121, switching elements 122, a humidity sensor 123, and a gate insulating layer 124.

In the first embodiment, one component functions as both the drain electrode and the pixel electrode. In contrast, in the second embodiment, a drain electrode 126b for the switching element 122 and the pixel electrode 121 are separately provided. The drain electrode 126b connects the drain area of a first semiconductor layer 125 and the pixel electrode 121. In this configuration, the area that is superposed in plan view on a gate electrode 127 and a source electrode 126a also functions as a pixel, increasing the aperture ratio.

Third Embodiment

Figure 6:
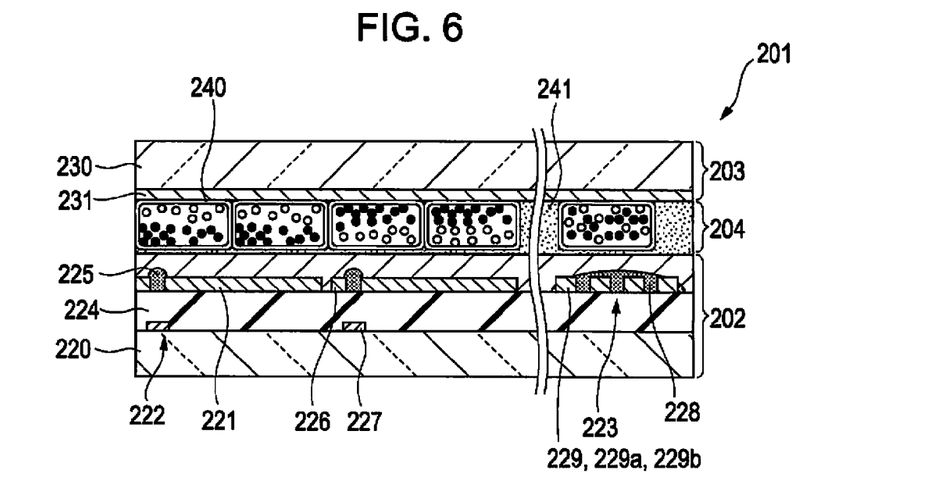
FIG. 6 is a section view showing the configuration of an electrophoretic display apparatus according to a third embodiment of the invention.

Hereinafter, a third embodiment of the invention is described. FIG. 6 is a section view showing the configuration of an electrophoretic display apparatus 201 according to the third embodiment. FIG. 6 corresponds to FIG. 2 of the first embodiment. The third embodiment is different from the other embodiments in terms of the configuration of a device substrate 202. The electrophoretic display apparatus 201 includes the device substrate 202, a counter substrate 203, and an electrophoretic layer 204. The device substrate 202 includes a substrate 220, pixel electrodes 221, switching elements 222, a humidity sensor 223, and a gate insulating layer 224.

The third embodiment is different from the second embodiment in the configuration of the switching element 222. The second embodiment has the top gate configuration where the gate electrode is provided above the first semiconductor, that is, on the side opposite the substrate side. In contrast, the third embodiment has the bottom gate configuration where the gate electrode 227 is provided below the first semiconductor layer 225, that is, on the substrate 220 side. The invention is also applicable to such a bottom-gate configuration.

The scope of the invention is not restricted to the embodiments and variations and modifications can be made without departing from the spirit and scope of the invention.

Figure 7:
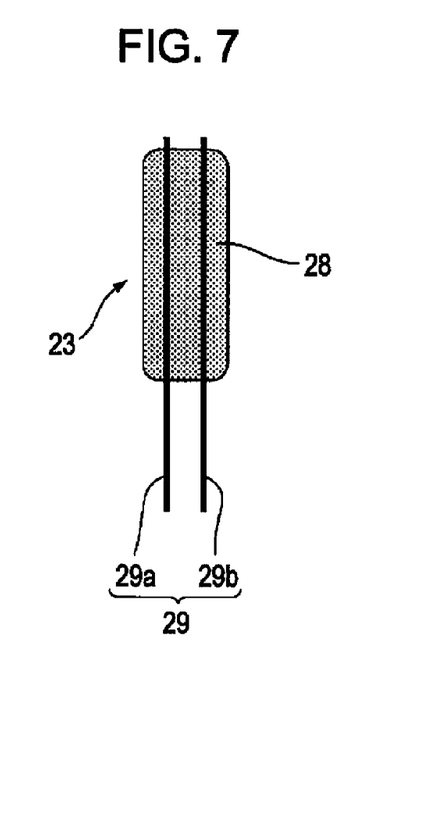
FIG. 7 is a plan view showing the configuration of another electrophoretic display apparatus according to the invention.

For example, in the embodiments described above, the electrodes 29 of the humidity sensor 23 have electrodes 29a and 29b. Each of the electrodes 29a and 29b has a comb-shaped portion and the comb-shaped portions are disposed with teeth of the comb-shaped portions interlocking one another. However, the invention is not restricted to this configuration. For example, as shown in FIG. 7, the electrodes 29a and 29b may be linear in shape.

Figure 8:
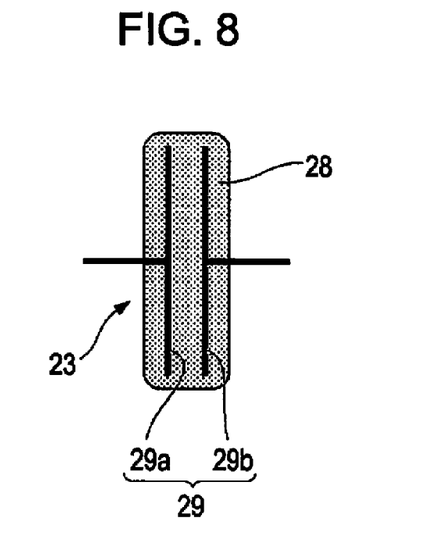
FIG. 8 is a plan view showing the configuration of still another electrophoretic display apparatus according to the invention.

Alternatively, as shown in FIG. 8, the electrodes 29a and 29b may have parallel portions that sandwich the second semiconductor layer 28 and the other portions connected to the parallel portions.

Figure 9A:
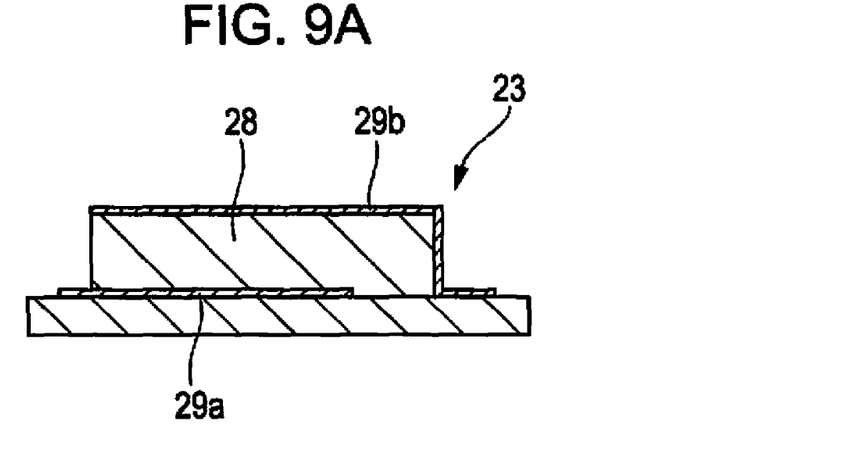
FIG. 9A is a section view and FIG. 9B is a plan view showing the configuration of yet another electrophoretic display apparatus according to the invention.
Figure 9B:
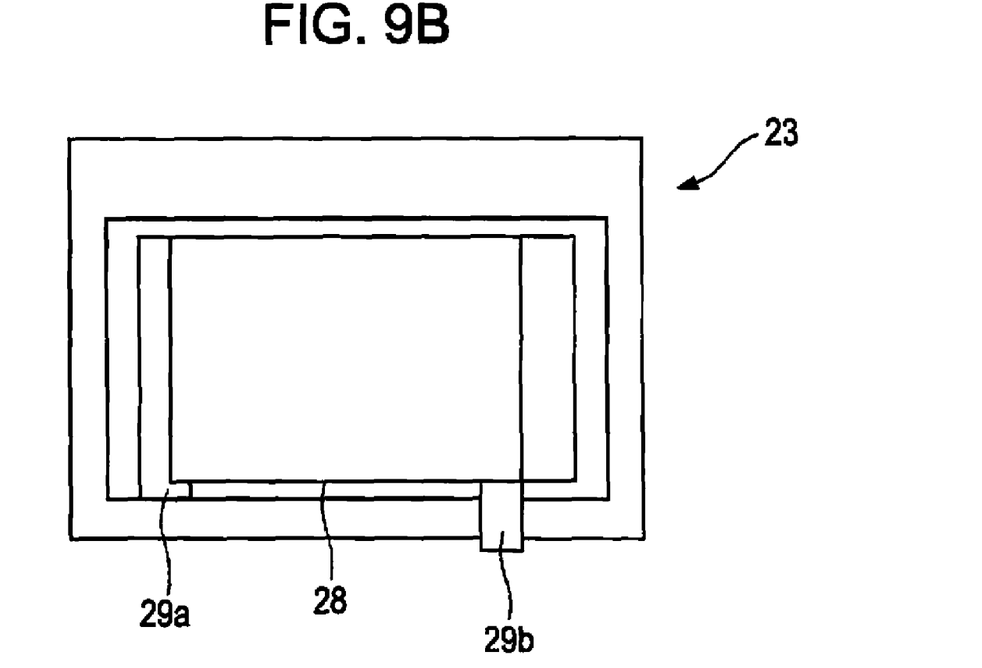

Alternatively, as shown in FIGS. 9A and 9B, the second semiconductor layer 28 may be held between a lower electrode 29a and an upper electrode 29b. The lower electrode 29a is disposed on the lower side of the second semiconductor layer 28. The upper electrode 29b is disposed on the upper side of the second semiconductor layer 28. Conversely, the electrode 29a may be disposed on the upper side of the second semiconductor layer 28 while the electrode 29b may be disposed on the lower side of the second semiconductor layer 28.

In addition to the humidity sensor 23, a temperature sensor may be provided in the non-display area. Examples of the temperature sensor may include a thermistor, a transistor sensor, and a platinum resistance thermometer. The thermistor may be formed by dissolving a material for forming the thermistor such as metallic oxide in a liquid and ejecting the dissolved material by an ink jet method in the same manner as handling organic semiconductor materials.

To determine temperature on the basis of the temperature characteristics of the switching element 22, an additional switching element 22 may be disposed in the non-display area. In this configuration, a temperature sensor is easily formed. Alternatively, a temperature sensor may be formed of an organic semiconductor having a larger temperature coefficient than the first organic semiconductor for forming the switching element 22.

In such a configuration including a temperature sensor, temperature data is determined as environment data in addition to humidity data, and hence environment change is detected more accurately. Thus, display operations are driven more properly and images are displayed stably even when the ambient environment changes.

Although electrophoretic display apparatuses have been described as examples of display apparatuses in the above embodiments, the invention is not restricted thereto. The invention is also applicable to other display apparatuses such as organic electroluminescence display apparatuses.

The entire disclosure of Japanese Patent Application No. 2007-325924, filed May Dec. 18, 2007 is expressly incorporated by reference herein.

What is claimed is:

1. A display apparatus comprising:
    a substrate;
    a display area including a plurality of pixels provided on the substrate;
    a switching element provided for each of the pixels, the switching element including a first semiconductor layer formed of a first organic semiconductor; and
    a humidity sensor provided on the substrate and outside the display area, the humidity sensor including, as a humidity sensitive layer, a second semiconductor layer formed of a second organic semiconductor having a correlation in terms of electric characteristics with the first organic semiconductor,
    wherein the first organic semiconductor and the second organic semiconductor are of the same type.

2. The display apparatus according to claim 1, wherein the humidity sensor further includes a pair of electrodes each having a comb-shaped portion in plan view; and the comb-shaped portions sandwich the second semiconductor layer with teeth of the comb-shaped portions interlocking one another.

3. The display apparatus according to claim 1, wherein the second semiconductor layer and the first semiconductor layer are identical in shape.

4. The display apparatus according to claim 1, further comprising:
  a pixel electrode provided on the substrate for each of the plurality of pixels and connected to the switching element; and
  a control unit configured to determine electric characteristics of the second semiconductor layer to provide a determination result and to control a voltage to be applied to the pixel electrode on the basis of the determination result.

5. A display apparatus comprising:
  a substrate;
  a display area including a plurality of pixels provided on the substrate;
  a switching element provided for each of the pixels, the switching element including a first semiconductor layer formed of a first organic semiconductor; and
  a humidity sensor provided on the substrate and outside the display area, the humidity sensor including, as a humidity sensitive layer, a second semiconductor layer formed of a second organic semiconductor having a correlation in terms of electric characteristics with the first organic semiconductor,
  wherein the humidity sensor further includes a pair of electrodes each having a comb-shaped portion in plan view; and the comb-shaped portions sandwich the second semiconductor layer with teeth of the comb-shaped portions interlocking one another.

6. A display apparatus comprising:
  a substrate;
  a display area including a plurality of pixels provided on the substrate;
  a switching element provided for each of the pixels, the switching element including a first semiconductor layer formed of a first organic semiconductor; and
  a humidity sensor provided on the substrate and outside the display area, the humidity sensor including, as a humidity sensitive layer, a second semiconductor layer formed of a second organic semiconductor having a correlation in terms of electric characteristics with the first organic semiconductor,
  wherein the second semiconductor layer and the first semiconductor layer are identical in shape.

7. A display apparatus comprising:
  a substrate;
  a display area including a plurality of pixels provided on the substrate;
  a switching element provided for each of the pixels, the switching element including a first semiconductor layer formed of a first organic semiconductor;
  a humidity sensor provided on the substrate and outside the display area, the humidity sensor including, as a humidity sensitive layer, a second semiconductor layer formed of a second organic semiconductor having a correlation in terms of electric characteristics with the first organic semiconductor;
  a pixel electrode provided on the substrate for each of the plurality of pixels and connected to the switching element; and
  a control unit configured to determine electric characteristics of the second semiconductor layer to provide a determination result and to control a voltage to be applied to the pixel electrode on the basis of the determination result.

* * * * *